Nov. 6, 1956
R. D. LOHMAN
2,769,907
SEMI-CONDUCTOR RELAXATION OSCILLATOR CIRCUITS
Filed June 29, 1954
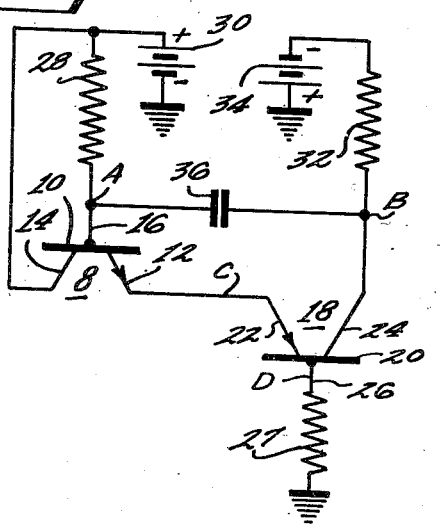
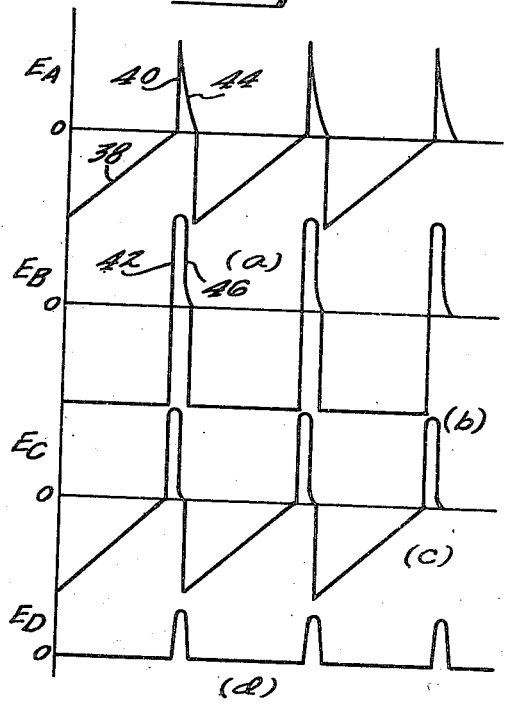
INVENTOR.
Robert D. Lohman
BY H. C. Newton
ATTORNEY

United States Patent Office 2,769,907
Patented Nov. 6, 1956

2,769,907
SEMI-CONDUCTOR RELAXATION OSCILLATOR CIRCUITS

Robert D. Lohman, Princeton Junction, N. J., assignor to Radio Corporation of America, a corporation of Delaware Application June 29, 1954, Serial No. 440,041

12 Claims. (Cl. 250—36)

This invention relates in general to oscillator circuits, and in particular to oscillator circuits of the relaxation type which utilize semi-conductor devices such as transistors as active signal translating elements.

One specific type of oscillator circuit which may employ semi-conductor devices is the relaxation oscillator. Relaxation oscillator circuits generate non-sinusoidal waves by gradually storing and quickly releasing energy either in the electric field of a capacitor or in the magnetic field of an inductor. Such circuits are capable of producing many different wave shapes and are, therefore, useful for many different circuit applications, although generally no one circuit is capable of providing more than one or two useful wave shapes. Such circuits are useful, for example, as frequency dividers or as sawtooth wave generators which can be used in the deflection circuits of television receivers.

One specific type of relaxation oscillator is the multivibrator. In general, this type of circuit utilizing electron tubes has a pair of tubes and the output of each is coupled to the input of the other to sustain oscillations. Multivibrator circuits utilizing transistors are also well known. As an example of this type circuit, reference is made to Eberhard Patent 2,605,306 in which the collector and base electrodes of a pair of point-contact devices are cross-coupled to sustain oscillations. In the conventional multivibrator circuit one transistor is conductive while the other transistor is non-conductive, so that the conduction duty cycle is relatively high.

It is well known that a junction transistor of the N–P–N type has a symmetrical conducting characteristic when compared with a junction transistor of the P–N–P type. Thus N–P–N and P–N–P type transistors are referred to as being opposite conductivity or complementary symmetry types. Similarly, a point-contact transistor of the P type is the symmetrical counterpart of a point-contact transistor of the N type. The symmetrical properties of transistors are described by George C. Sziklai in the "Proceedings of the I. R. E.," June 1953, pages 717–724. The present invention in one aspect utilizes this characteristic of transistors, which finds no counterpart in vacuum or electron tubes, to provide a new and useful relaxation oscillator circuit.

It is, accordingly, a principal object of the present invention to provide an improved and efficient relaxation oscillator circuit utilizing semi-conductor devices such as transistors.

It is another object of the present invention to provide an improved relaxation oscillator circuit utilizing a pair of junction transistors of opposite conductivity types which is stable and efficient in operation.

It is a further object of the present invention to provide an improved transistor relaxation oscillator circuit which is capable of providing a plurality of different and useful wave shapes.

It is a still further object of the present invention to provide a multivibrator circuit utilizing junction transistors, the conduction duty cycle of which is low and which is characterized by stable and efficient circuit operation.

These and further objects and advantages of the present invention are achieved in general by providing a relaxation oscillator circuit which utilizes a pair of opposite conductivity junction transistors. The respective emitter electrodes of the transistors are connected together, and the base electrode of one transistor is coupled through a storage capacitor to the collector of the other. Such a circuit has been found to be characterized by stable operation and is capable of providing a variety of different wave shapes. Moreover, since the transistors conduct for a time equal to the duration of the generated pulses, their conduction duty cycle is low and the efficiency of the circuits is relatively high.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1 and 3 are schematic circuit diagrams of relaxation oscillator circuits each of which utilizes a pair of opposite conductivity transistors in accordance with the present invention;

Figure 2 is a graph illustrating waveforms at various points in the circuit illustrated in Figure 1; and Figure 4 is a schematic circuit diagram of a sawtooth wave generator utilizing a relaxation oscillator circuit of the type illustrated in Figure 1 and embodying the present invention.

Referring now to the drawing, wherein like parts are indicated by like reference numerals throughout the figures, and referring particularly to Figure 1, a relaxation oscillator circuit embodying the novel features of the present invention comprises a pair of opposite conductivity or complementary symmetry type transistors 8 and 18. Thus the transistor 8 has been chosen for purposes of explanation as being of P type conductivity, while the transistor 18 is of N type conductivity. Since, moreover, junction transistors are to be preferred, the transistor 8 will be of the N–P–N junction type while the transistor 18 will be of the P–N–P junction type. It should be understood, however, that the transistor 8 could be of the P–N–P type so long as the polarity of the biasing source was reversed. In this case, however, the transistor 18 would have to be of the N–P–N type and the appropriate changes in the polarity of the biasing source for that transistor would also have to be made. It is apparent, therefore, that all that is essential for proper circuit operation is that the transistors 8 and 18 are of opposite conductivity types, the correct polarity of the biasing potentials being assumed.

Each of the transistors 8 and 18 includes a semi-conductive body, with which are cooperatively associated in a well known manner three electrodes. Thus the N–P–N transistor 8 includes a semi-conductive body 10 having three electrodes. These electrodes are designated, as is conventional, as an emitter 12, a collector 14 and a base 16. Similarly, the P–N–P transistor 18 has a semi-conductive body 20 and three electrodes which are designated as an emitter 22, a collector 24 and a base 26.

To provide biasing potentials for the N–P–N transistor 8 and the P–N–P transistor 18, a pair of biasing batteries 30 and 34 are provided. The battery 30, the negative terminal of which is connected to a source of fixed reference potential or ground for the system as shown, supplies biasing potential for the N–P–N transistor 8. The positive terminal of the battery 30 is connected directly with the collector 14, and through a biasing resistor 28 to the base 16 of the transistor 8. Another biasing battery 34 has its positive terminal grounded and its negative terminal connected through a resistor 32 to the collector 24 of the P–N–P transistor 18. Accordingly, each of the collector electrodes 14 and 24 are biased in the reverse or relatively non-conducting direction with respect to their respective base electrodes 16 and 26.

To provide relaxation oscillator operation, in accordance with the present invention, a storage capacitor 36 is connected between the base 16 of the N–P–N transistor 8 and the collector 24 of the P–N–P transistor 18. Moreover, the emitter 12 of the N–P–N transistor 8 is connected directly with the emitter 22 of the P–N–P transistor 18. The circuit is completed by a connection from the base 26 of the P–N–P transistor 18 to ground which includes the resistor 27.

The operation of the circuit may be best understood with reference to Figure 2 in conjunction with Figure 1. For this purpose, it is assumed that initially both transistors are non-conducting and that the capacitor 36 is initially in an uncharged condition. It is also assumed that the resistance of the resistor 28 is greater than the resistance of the resistor 32. It should be noted, however, that the resistor 28 may be eliminated from the circuit, the leakage resistance of the transistor 8 providing its function if this is done. At time $t=0$ power is applied to the circuit. When power is applied the capacitor 36 will begin to charge through the conductive path from the positive terminal of the battery 30, the resistor 28 and the resistor 32 to the negative terminal of the battery 34. Since the resistance of the resistor 28 is greater than the resistance of the resistor 32, the voltage drop across the resistor 28 will be larger than the drop across the resistor 32 and the point A will be negative with respect to ground. The transistors 8 and 18 will, therefore, remain non-conductive.

As the charging current for the capacitor 36 decreases the point A will become more and more positive (i. e., less negative) as shown by the portion 38 of the curve illustrated in Figure 2a. Eventually point A reaches ground potential and then begins to go positive as shown by the portion 40 of the curve illustrated in Figure 2a. As the point A begins to go positive the transistor 8 begins to conduct. The capacitor 36 then begins to discharge through the base 16 of the N–P–N transistor 8, and a current which is equal to the discharge current multiplied by the current amplification factor ($\alpha_{cb}$) of the N–P–N transistor 8 flows out of the emitter 12 of that transistor into the emitter 22 of the P–N–P transistor 18. Both transistors are then in a highly conductive state. Both point A and point B then attain a positive potential almost instantaneously as shown by the portions 40 and 42 of Figures 2a and 2b respectively. As the capacitor 36 continues to discharge, the base current through the transistor 8 decreases and the potential of points A and B begins to decrease as shown by the portions 44 and 46 of the curves in Figures 2a and 2b respectively.

When the potential of points A and B is at ground, the capacitor 36 has discharged completely and the potentials in the various portions of the circuit are the same as before the power was applied. Both transistors are then non-conductive.

The cycle then repeats in the same manner as shown by the several cycles of operation of the curves illustrated in Figures 2a and 2b. The observed voltage waveforms at points C and D over several cycles of operation are shown in Figures 2c and 2d respectively. It is evident from an inspection of the various curves shown in Figure 2 that a variety of waveforms are available with a circuit embodying the present invention. Accordingly, a circuit of this type may find wide application as a source of different waveforms. In general, however, since points B and C can be connected to a relatively low impedance, the waveforms at these points may find the widest application. It is also evident that since both transistors conduct only for the pulse duration the conduction duty cycle of the circuit is relatively low.

To simplify the circuit arrangement shown in Figure 1, a single source of biasing potential may be utilized. This aspect of the invention is illustrated in Figure 3, reference to which is now made. In this figure a single battery 35 provides the biasing potentials for both transistors and has its negative terminal connected to a source of fixed reference potential or ground for the system as shown. The collector 24 of the P–N–P transistor 18 is connected through a resistor 33 to the point of ground potential. The positive terminal of the battery 35 is connected directly with the collector 14 of the N–P–N transistor 8 and through a predetermined portion of the base resistor 27 and a variable tap 31 to the base 26 of the P–N–P transistor 18. By varying the resistance of the resistor 27 by means of the tap 31, the frequency of oscillation may be varied as will be explained in connection with Figure 4.

In other respects the circuit illustrated in Figure 3 is seen to be substantially identical with the one illustrated in Figure 1 and operates in substantially the same manner. Thus the emitters 12 and 22 of the transistors 8 and 18 respectively are connected together and the base 16 of the N–P–N transistor 8 is coupled through a storage capacitor 36 to the collector 24 of the P–N–P transistor 18. The circuit illustrated in Figure 3 is seen to be somewhat simpler than the one illustrated in Figure 1, however, in that one biasing battery and one resistor have been eliminated.

As was mentioned hereinbefore, relaxation oscillator circuits may be useful as sawtooth wave generators which can be used, for example, in the deflection circuits of television signal receivers. This application of the present invention is illustrated in Figure 4 of the drawing, reference to which is now made. The sawtooth wave generator illustrated in Figure 4 is similar to the relaxation oscillator illustrated in Figure 1 and includes the two opposite conductivity type transistors 8 and 18 which have their emitter electrodes 12 and 22 respectively connected together. In addition, and in the same manner as in Figure 1, the base 16 of the N–P–N transistor 8 is connected through the storage capacitor 36 to the collector 24 of the P–N–P transistor 18.

Moreover, the polarity of the biasing potentials which are applied to the electrodes of the transistors are identical to those which are shown and described in Figure 1 of the drawing. One difference, however, is that the resistor 28 which is serially connected between the base 16 of the N–P–N transistor 8 and the positive terminal of the biasing battery 30, is made variable by the addition of a tap 29. In this manner, the frequency of oscillation of the relaxation oscillator circuit may be varied. For example, as the resistance of the resistor 28 is increased, there will be a corresponding decrease in the frequency of oscillation. It should be also noted that the frequency may be varied by varying the capacity of the storage capacitor 36. Thus by increasing the capacity of the capacitor 36 the frequency of oscillation will be decreased.

Another difference in the circuit illustrated in Figure 4 as compared with the circuit illustrated in Figure 1 is that the resistor 27 which is connected between the base 26 of the P–N–P transistor 18 and ground is made variable by means of the variable tap 31 in the same manner as in Figure 3. By this expedient the width of the pulse waveforms may be varied as well as the symmetry of the sawtooth waveform. Output pulses may be taken from point B in Figure 3, which is, as was explained hereinbefore, a relatively low impedance source. Accordingly, a diode 52 may have its anode connected directly with the collector 24 of the transistor 18. The circuit means for generating the sawtooth wave also includes a serially connected resistor 54 and a battery 56 which are connected between the cathode of the diode 52 and ground as shown, the positive terminal of the battery being grounded. A capacitor 58 is connected in shunt relation to the resistor 54 and the battery 56. The output circuit is completed by a pair of output terminals 60, from which a sawtooth wave may be taken.

A circuit of the type just described may be triggered if desired. For this purpose, a pair of trigger input terminals 50 are provided, one of which is connected to ground and the other of which is connected through a coupling capacitor 48 to the base 16 of the N–P–N transistor 8. In operation, the application of a positive pulse to the terminals 50 will trigger the relaxation oscillator circuit into its high current conducting state slightly ahead of its normal reaction time. As a result the frequency of the relaxation oscillator circuit will be somewhat higher than the frequency of that circuit without the application of trigger pulses. The circuit in other respects operates in an identical manner to the one illustrated in Figure 1 of the drawing. Accordingly, a voltage pulse will appear at the point B of the type which is illustrated in Figure 2b of the drawing. This pulse will then rapidly charge the capacitor 58 through the diode 52. The capacitor 58 is then discharged through the resistor 54 to the negative terminal of the battery 56 in the interval between the generation of the output pulses. As a result, a useful sawtooth wave may be derived from the terminals 60. This sawtooth wave may be used, for example, in the deflection circuits of television signal receivers.

It is apparent that as in Figure 1 the specific conductivity of the transistors 8 and 18 may be reversed so long as the polarity of the biasing batteries is reversed. In addition, the polarity of the diode 52 would also have to be reversed, as will the polarity of the biasing battery 56.

While it will be understood that the circuit specifications may vary according to the design for any particular application, the following circuit specifications are included for the circuit of Figure 4, by way of example only:

Resistors 28, 31, 32 and 54    250,000; 10,000; 750 and 9100 ohms, respectively.
Capacitors 36 and 58___ 1 and 4 microfarads, respectively.
Batteries 30, 34 and 56_ 6; 6; and 16.5 volts, respectively.

As described herein, it is apparent that by provision of the present invention a relatively simple and extremely reliable relaxation oscillator circuit is possible by utilizing opposite conductivity transistors. The circuit uses junction transistors and has a relatively low conduction duty cycle. It is, therefore, highly efficient and has the further advantage of being capable of providing a plurality of different and useful wave shapes.

What is claimed is:

1. In a relaxation oscillator circuit, the combination with a first semi-conductor device of one conductivity type having a first base, a first emitter and a first collector electrode, and a second semi-conductor device of an opposite conductivity type having a second base, a second emitter and a second collector electrode, of circuit means including a storage element coupling said first base electrode with said second collector electrode, means connecting said first emitter electrode with said second emitter electrode, and conductive circuit means for applying energizing potentials to said devices and for charging said storage element and operative to bias said first and second semi-conductor devices into a current conducting condition.

2. In a pulse generator circuit including means providing a point of reference potential therein, the combination comprising a first transistor of one conductivity type, and having a first base, a first emitter and a first collector electrode, a second transistor of an opposite conductivity type, and having a second base, a second emitter and a second collector electrode, a storage capacitor connected between said first base electrode and said second collector electrode, means connecting said first emitter electrode with said second emitter electrode, a first resistor and a first source of biasing potential serially connected between said first base electrode and said point of reference potential, means connecting said first collector electrode with said first source of biasing potential, a second resistor and a second source of biasing potential serially connected between said second collector electrode and said point of reference potential, means connecting said second base electrode with said point of reference potential, and means for cyclically deriving from said circuit an output wave including an output circuit connected with said second collector electrode.

3. In a relaxation oscillator circuit the combination with a first junction transistor of one conductivity type having a first base, a first emitter and a first collector electrode, and a second junction transistor of an opposite conductivity type having a second base, a second emitter and a second collector electrode, of circuit means including a storage capacitor coupling said first base electrode with said second collector electrode, means coupling said first emitter electrode with said second emitter electrode, and conductive circuit means for applying energizing potentials to said devices and for charging said storage capacitor and operative to bias said first and second semiconductor devices into a current conductive condition.

4. A relaxation oscillator circuit as defined in claim 3 wherein said first junction transistor is of the N–P–N type and said second junction transistor is of the P–N–P type.

5. A relaxation oscillator circuit as defined in claim 3 wherein said first junction transistor is of the P–N–P type and said second junction transistor is of the N–P–N type.

6. In an oscillator circuit the combination with a first semi-conductor device of one conductivity type having a first base, a first emitter and a first collector electrode, and a second semi-conductor device of an opposite conductivity type having a second base, a second emitter and a second collector electrode, of circuit means including a storage element coupling said first base electrode with said second collector electrode, means coupling said first emitter electrode with said second emitter electrode, and means for applying energizing potentials to said devices to bias said devices in the current conducting direction and to provide a discharge path for said storage element, said first and second devices being conductive only for the output pulse duration of said circuit.

7. In a semi-conductor pulse generator circuit including means providing a point of reference potential therein, the combination comprising a first junction transistor including a first semi-conductive body of one conductivity type, and a first base, a first emitter and a first collector electrode in contact with said body, a second junction transistor including a second semi-conductive body of an opposite conductivity type, and a second base, a second emitter and a second collector electrode in contact with said second body, a storage capacitor connected between said first base electrode and said second collector electrode, means connecting said first emitter electrode with said second emitter electrode, a first resistor and a first source of biasing potential serially connected between said first base electrode and said point of reference potential, means connecting said first collector electrode with said first source of biasing potential, a second resistor and a second source of biasing potential serially connected between said second collector electrode and said point of reference potential, the resistance of said first resistor being greater than the resistance of said second resistor, means including a third resistor connecting said second base electrode with said point of reference potential, means for applying trigger pulses to said first base electrode, and means for cyclically deriving from said circuit an output wave including an output circuit connected with said second collector electrode.

8. A relaxation oscillator circuit comprising, in combination, a first semi-conductor device of one conductivity type having a first base, a first emitter and a first collector electrode, and a second semi-conductor device of an opposite conductivity type having a second base, a second emitter and a second collector electrode, of circuit means including a storage element coupling said first base electrode with said second collector electrode, means coupling said first emitter electrode with said second emitter electrode, means for applying energizing potentials to said devices and for charging said storage element and operative to bias said first and second semi-conductor devices into a current conductive condition whereby said capacitor is discharged through said first semi-conductor device, and an output circuit coupled with said second collector electrode.

9. In an oscillator circuit the combination comprising a pair of opposite conductivity type semi-conductor devices each of which includes a base, an emitter and a collector electrode, said emitter electrodes being connected in common, a storage capacitor coupling the base electrode of one of said devices with the collector electrode of the other of said devices, and direct-current supply means for charging said capacitor to render said semi-conductor devices current conductive and to provide a conductive discharge path for said capacitor and relaxation oscillator operation of said oscillator circuit, said semi-conductor devices being conductive only during the output pulse duration of said circuit.

10. An oscillator circuit as defined in claim 9 wherein one of said semi-conductor devices is an N–P–N junction transistor and the other of said devices is a P–N–P junction transistor.

11. A sawtooth wave generator including means providing a point of reference potential therein comprising, in combination, a first junction transistor including a first semi-conductive body of one conductivity type, and a first base, a first emitter and a first collector electrode in contact with said body, a second junction transistor including a second semi-conductive body of an opposite conductivity type, and a second base, a second emitter and a second collector electrode in contact with said second body, a storage element connected between said first base electrode and said second collector electrode, means connecting said first emitter electrode with said second emitter electrode, a first resistor and a first source of biasing potential serially connected between said first base electrode and said point of reference potential, a second resistor and a second source of biasing potential serially connected between said second collector electrode and said point of reference potential, a pair of output terminals for said generator, means including a diode coupling one of said output terminals with said second collector electrode, a capacitor serially connected between said diode and said point of reference potential, and a conductive discharge path for said capacitor whereby a sawtooth output wave is cyclically derived from said output terminals.

12. In a semi-conductor pulse generator circuit the combination comprising a first transistor including a first semi-conductive body of one conductivity type, and a first base, a first emitter and a first collector electrode in contact with said body, a second transistor including a second semi-conductive body of an opposite conductivity type, and a second base, a second emitter and a second collector electrode in contact with said second body, means coupling said first emitter electrode with said second emitter electrodes, a capacitor connected between said first base electrode and said second collector electrodes, means providing energizing potentials for said first and second transistors to bias said devices in the current conducting direction to provide a discharge path for said capacitor through said first transistor, and pulse output means for cyclically deriving from said circuit an output wave, said transistors being conductive only during the duration of said output wave.

References Cited in the file of this patent

UNITED STATES PATENTS

| | | |
|---|---|---|
| 2,605,306 | Eberhard | July 29, 1952 |
| 2,666,818 | Shockley | Jan. 19, 1954 |

OTHER REFERENCES

"A Study of Transistor Circuits For Television"; by Sziklai et al., pages 708–717; Proc. IRE, vol. 41, No. 6, June 1953.

"Symmetrical Properties of Transistor and Their Applications"; Sziklai, pages 717–724, Proc. IRE, vol. 41, No. 6, June 1953.

Article: "Junction Transistor Circuit Applications," by Sulzer, pages 170–173 of Electronics, August 1953.